June 18, 1968  R. E. MILEY  3,388,929
IMPLEMENT MOUNTING FRAME

Filed Oct. 20, 1966  3 Sheets-Sheet 1

INVENTOR
RICHARD E. MILEY
BY
*John C. Thompson*
ATTORNEY

INVENTOR
RICHARD E. MILEY
BY
ATTORNEY

3,388,929
IMPLEMENT MOUNTING FRAME

Richard Erwin Miley, Horicon, Wis., assignor to Deere & Company, Moline, Ill., a corporation of Delaware
Filed Oct. 20, 1966, Ser. No. 588,197
3 Claims. (Cl. 280—481)

The present invention relates generally to tractors and more particularly to an implement mounting frame which may be supported by the forward end of a tractor and to which various implements may be readily secured.

The principal object of the present invention is to provide an implement mounting frame to which implements may be secured easily.

More particularly it is an object to provide an implement mounting frame on the forward end of a tractor having two spring-biased pins which cooperate with apertures in the implement frame for securing the implement on the forward end of the tractor.

Another object of this invention is to provide an implement mounting frame of low cost and high durability.

These and other objects and advantages of this invention will be apparent to those skilled in the art after a consideration of the following detailed description, taken in conjunction with the accompanying drawings in which the preferred form of this invention is illustrated.

Figure 1:
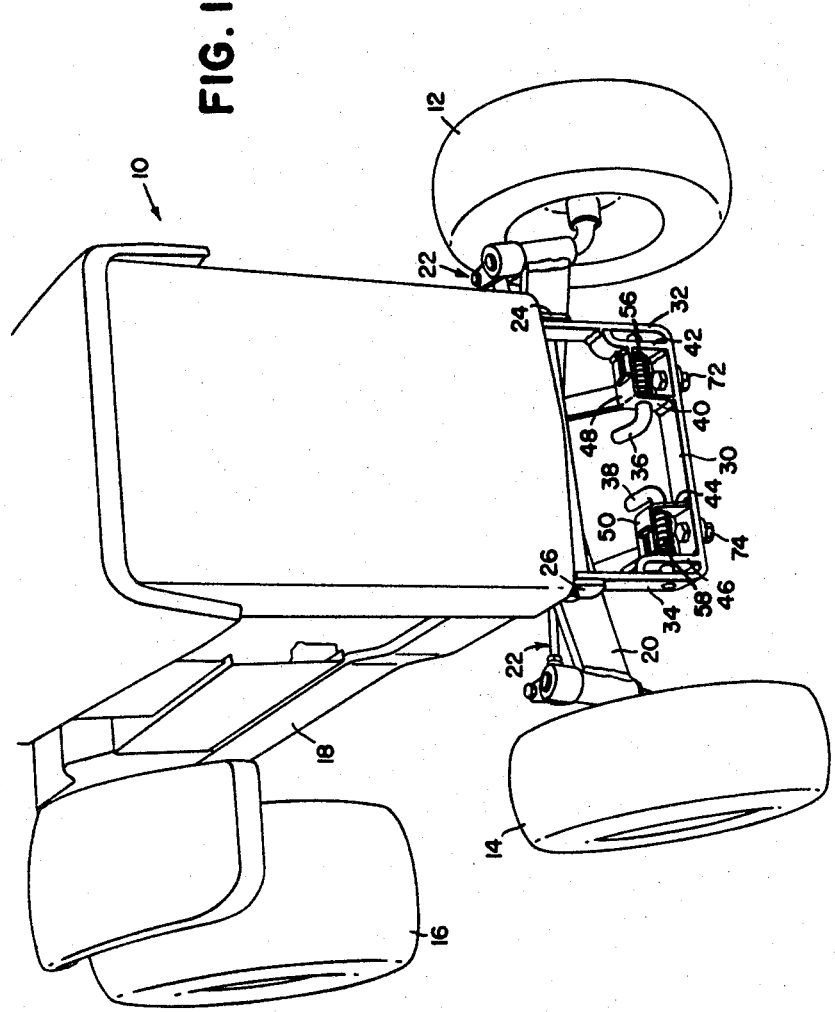
FIG. 1 is a perspective view of a portion of a tractor to which the implement mounting frame of this invention has been secured.

In the following description right-hand and left-hand reference is determined by standing to the rear of the tractor and facing the direction of travel.

The tractor, which is indicated generally at 10, includes left and right steerable front wheels 12 and 14, respectively, and driven rear wheels 16. The tractor frame includes longitudinally extending side rails 18 (only one of which is shown) and a front axle 20 which rotatably carries at its outer ends the wheels 12 and 14, the wheels being turned by conventional steering linkage means indicated generally at 22. Rigidly interconnected with the forward ends of the longitudinally extending frame 18 are left and right downwardly extending lugs 24, 26, which are disposed forwardly of the axle 20.

The implement mounting frame of this invention includes a generally U-shaped frame having a bight portion 30 and left and right upwardly extending legs 32, 34 mounted above the bight 30. Between the legs 32 and 34 is a pair of opposed pins 36 and 38. Each of the pins 36, 38 is disposed within a pair of inner and outer upwardly extending apertured members. Thus pin 36 is disposed within inner member 40 and outer member 42, and pin 38 is disposed within apertured inner member 44 and apertured outer member 46. It should be noted that the inner members 40 and 44 are formed with integral transversely extending top portions 48 and 50 which are rigidly secured at their outer ends to an upper portion of the members 42 and 46, respectively. The apertured members 42 and 46 are disposed relatively closely to the legs 32 and 34, there being only sufficient distance between them to receive an apertured mounting frame of an implement, such as for example apertured blade arms 52 and 54. The pins 36 and 38 will pass through the aperture in the mounting structure of the attached implement and also through the aperture in the associated legs 32, 34 thereby holding the implement to the mounting frame in double shear.

The pins are normally biased outwardly by means of left and right springs 56, 58 which abut the members 40, 44 at one end and a washer 59 held about the pins 36 and 38 by means of a roll pin 60. The upper end of the roll pin 60 projects through interconnecting longitudinally and transversely extending slots 62 and 64 in the transverse portion of 40, 44. When the end of the roll pin is disposed within the longitudinally extending portion, the pin 36 or 38 is biased outwardly by the spring 59, but if the end of the pin 60 should be disposed to either side of the slot 62 within the slot 64, it will serve as a detent to hold the pin in its inner position.

A rearwardly extending bracing structure is provided which includes left and right braces 66, 68, the lower forward end 70 of each of the braces 66, 68 being bolted in a conventional fashion to the underside of the bight 30 by fasteners 72 and 74 as can best be seen in FIG. 1. The upper rearward end 76 of each of the braces 66 and 68 is similarly bolted to the tractor frame as at 78 (FIG 2).

Figure 2:
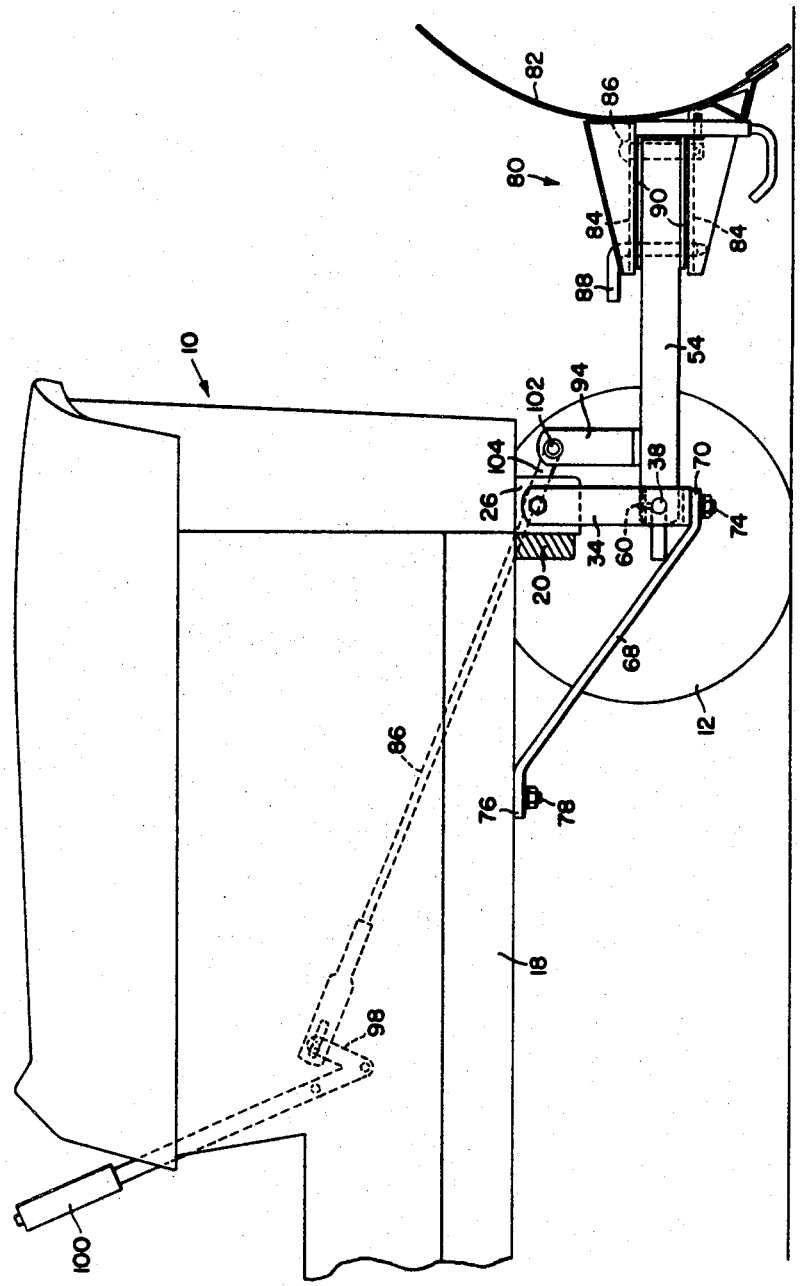
FIG. 2 is a side view of the implement mounting frame showing the manner in which it is secured to the forward end of a tractor, the implement mounting frame having a front blade secured thereto.
Figure 3:
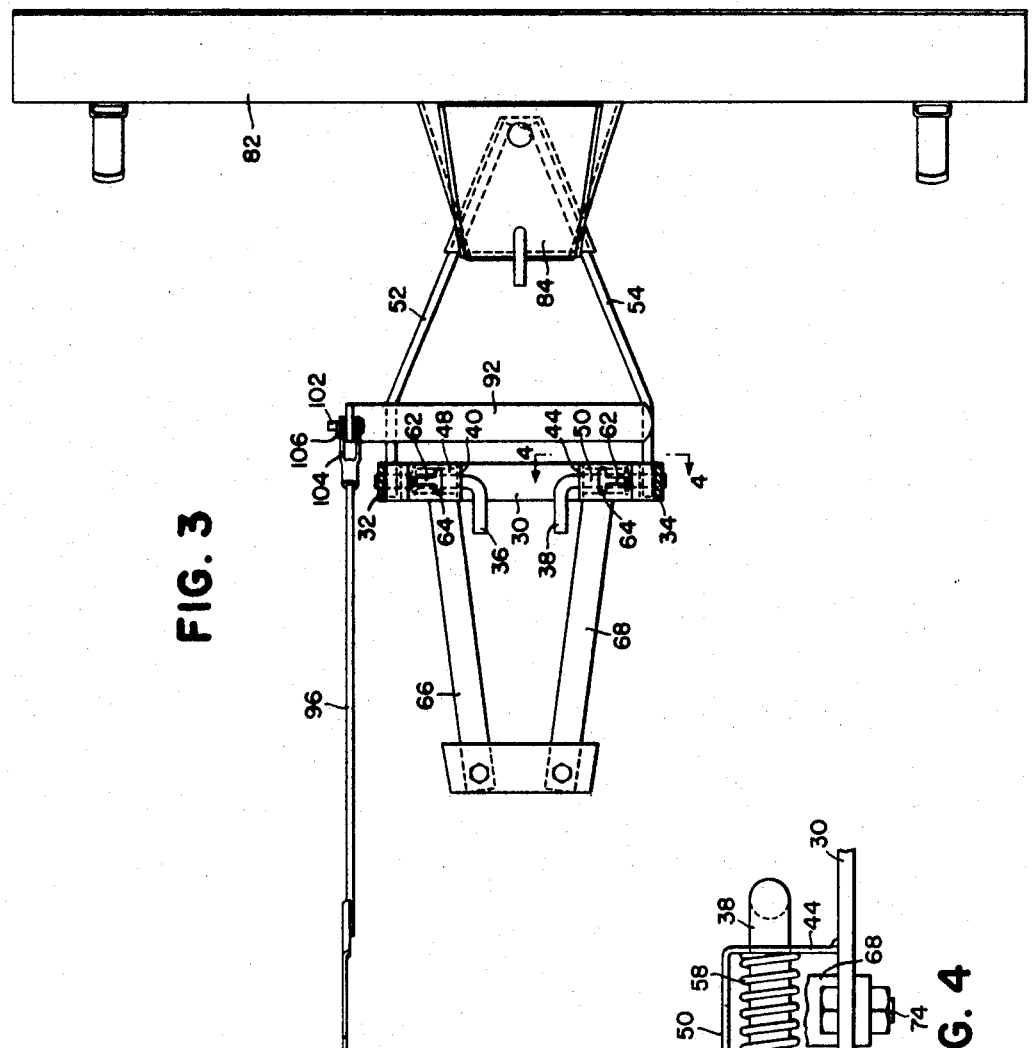
FIG. 3 is a plan view of the construction shown in FIG. 2.
Figure 4:
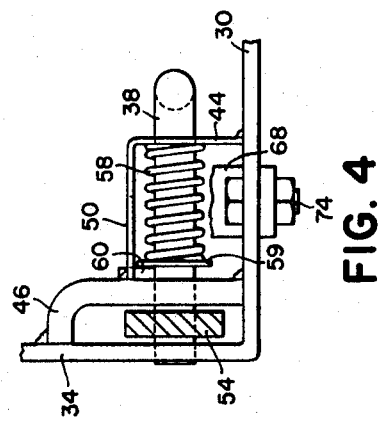
FIG. 4 is a view taken along the line 4—4 in FIG. 3.

In FIG. 2 an implement, indicated generally at 80, is shown attached to the mounting structure of this invention, the implement including a blade 82 secured to the forward end of mounting arms 52 and 54 by apertured sector plates 84 which are secured at their forward ends by means of a pivot pin 86 and at their rear ends by locking pin 88 to fixed plates 90 secured rigidly to the forward ends of the arms 52 and 54. A strap 92 interconnects the rear ends of arms 52 and 54 and is provided with an upwardly extending bent end portion 94 which is apertured at its upper end and receives one end of the tractor lift link 96, the other end of the lift link 96 being secured to a bell crank 98 pivotally secured on the tractor, the bell crank being actuated through a hand lever 100 in a generally conventional fashion.

To mount the implement 80 to the tractor 10 it is only necessary to dispose the apertured arms 52 and 54 between the outer members 42, 46 and the leg members 32 and 34, the pins being held in their withdrawn position by means of the detent structure 60, 64 while the positioning takes place. After the arms have been properly positioned, it is only necessary to move the pins from the detent position to automatically lock the implement to the tractor. A pin 102 is then passed through the bifurcated end 104 of the lift link 96 and the aperture within the unstanding member 94 to complete the mounting assembly, the pin 102 being secured in place by a conventional hairpin keeper 106.

While the preferred structure in which the principles of the present invention have been incorporated is shown and described above, it is to be understood that the invention is not to be limited to the particular details, shown and described above, but that, in fact, widely different means may be employed in the practice of the broader aspects of the invention.

What is claimed is:

1. An implement mounting frame for securing implements to the forward end of a tractor having a pair of spaced apart steerable front wheels and a pair of rear traction wheels, said mounting frame comprising: a generally U-shaped structure having a bight and upwardly extending legs securable to opposed side portions of the forward end of the tractor, the lower ends of said legs being apertured, opposed pairs of inner and outer upwardly extending apertured members carried by said bight, a pair of transversely extending pin members, each of the pin members being disposed within the apertures of one of the pairs of inner and outer members, resilient means interconnecting each of the pins with its associated inner member, said resilient means normally biasing the pin means outwardly whereby the outer end of the pin is normally disposed within the aperture in the leg, and a pair of detent means operable to hold the pins with the outer end away from said apertured leg.

2. The implement mounting frame set forth in claim 1 in which rearwardly extending brace means are provided, the forward ends of which are rigidly secured to said bight and the rearward ends of which are securable to a rearward portion of said tractor.

3. The implement mounting frame set forth in claim 1 in which each of said detent means includes a plate carried by the upper ends of each pair of inner and outer members, said plate having a first slot parallel to said pin and a second slot transversely disposed to said pin, said slots being interconnected, and abutment means carried by said pin and cooperable with said slots to hold the pin in selected positions.

References Cited

UNITED STATES PATENTS

| | | | |
|---|---|---|---|
| 2,651,121 | 9/1953 | Shannon | 37—42 |
| 2,710,464 | 6/1955 | Husting | 37—42 |
| 2,884,720 | 5/1959 | Meyer et al. | 37—44 X |
| 3,005,511 | 10/1961 | Riedy | 180—89 |
| 3,214,138 | 10/1965 | Jocher et al. | |

LEO FRIAGLIA, *Primary Examiner.*